US008500384B2

(12) United States Patent  (10) Patent No.: US 8,500,384 B2
Quirion  (45) Date of Patent: Aug. 6, 2013

(54) CARGO LOADER FOR AN AIRCRAFT WITH AN ARTICULATE SCISSOR ASSEMBLY

(75) Inventor: Patrick Quirion, Sherbrooke (CA)

(73) Assignee: TLD (Canada) Inc., Quebec (CA)

( * ) Notice: Subject to any disclaimer, the term of this patent is extended or adjusted under 35 U.S.C. 154(b) by 66 days.

(21) Appl. No.: 13/059,842

(22) PCT Filed: Aug. 18, 2009

(86) PCT No.: PCT/CA2009/001162
§ 371 (c)(1),
(2), (4) Date: Feb. 18, 2011

(87) PCT Pub. No.: WO2010/020050
PCT Pub. Date: Feb. 25, 2010

(65) Prior Publication Data
US 2011/0139933 A1    Jun. 16, 2011

Related U.S. Application Data

(60) Provisional application No. 61/090,046, filed on Aug. 19, 2008.

(51) Int. Cl.
*B65F 3/00* (2006.01)
(52) U.S. Cl.
USPC ........... 414/541; 414/540; 414/471; 414/478; 414/488; 244/137.1
(58) Field of Classification Search
USPC .................. 414/541, 540, 471, 478, 488, 346, 414/495; 244/137.1
See application file for complete search history.

(56) References Cited

U.S. PATENT DOCUMENTS

| 3,341,042 | A | * | 9/1967 | Carder .......................... 414/471 |
| 3,902,616 | A |   | 9/1975 | Santic et al. |
| 4,408,739 | A |   | 10/1983 | Buchsel |
| 4,662,809 | A |   | 5/1987 | Sturtz et al. |
| 5,110,153 | A |   | 5/1992 | Kallansrude et al. |
| 5,111,546 | A |   | 5/1992 | Hahn et al. |
| 2004/0115034 | A1 | * | 6/2004 | Arijoki et al. ................. 414/495 |

FOREIGN PATENT DOCUMENTS

| DE | 29 05 236 A1 | 8/1980 |
| EP | 0 559 940 A1 | 9/1993 |
| FR | 2 419 900 | 10/1979 |
| WO | WO 2005/018276 A1 | 11/2005 |

* cited by examiner

*Primary Examiner* — Saul Rodriguez
*Assistant Examiner* — Willie Berry, Jr.
(74) *Attorney, Agent, or Firm* — McDermott Will & Emery LLP (57) ABSTRACT

This invention concerns an aircraft cargo loader comprising a deck platform; a front and a rear wheel assembly units; and a scissor assembly extending under the platform for supporting it and move it between an open and close position. The scissor comprises a first and a second elongated arm pivotally connected by a swivel joint. Each of the first and second elongated members have an upper end pivotally attached to the deck platform and a lower end pivotally connected to the rear and front wheel assembly unit respectively. One of the first and second elongated members is articulated and comprising an upper segment pivotally connected to a lower segment. The loader comprises a first controllable actuator to move the scissor assembly between the open and close positions and a second controllable actuator to actuate the upper segment relative to the lower segment so as to tilt the deck platform longitudinally.

8 Claims, 10 Drawing Sheets

CARGO LOADER FOR AN AIRCRAFT WITH AN ARTICULATE SCISSOR ASSEMBLY

RELATED APPLICATIONS

This application is the U.S. National Phase under 35 U.S.C. §371 of International Application No. PCT/CA2009/001162, filed on Aug. 18, 2009, which in turn claims the benefit of U.S. Provisional Application No. 61/090,046, tiled on Aug. 19, 2008, the disclosures of which Applications are incorporated by reference herein.

FIELD OF THE INVENTION

The present invention generally relates to aircraft loaders for lifting cargo and freight onto and off an aircraft cargo bay. More precisely, but not exclusively, the invention concerns a transportable self-propelled aircraft loader, suitable for example in military application, and including an articulate scissor assembly for longitudinally tilting the deck platform of the loader.

BACKGROUND OF THE INVENTION

Aircraft loaders are used for aircraft servicing and are designed to transfer containers, pallets, equipment and other types of goods to and from aircraft. Existing loaders usually have an elevator platform and a supporting assembly for supporting the platform, the supporting assembly being provided with actuating means for lifting or lowering the platform. The operation of the loader is controlled by a control station.

Loaders designed to service commercial aircraft are usually designed for use on a relatively flat, paved ground surface. The aircraft cargo floors they service are also generally level and parallel to the ground. However, surface conditions are quite different from those in the military domain. Military aircraft loaders must be able to work on an uneven, inclined, and rough ground surface. In addition, the cargo bays of the aircraft they service are rarely level with the platform loader, or parallel to the ground. When used for example in military applications or other applications where the loader has to travel on uneven or incline surfaces, aircraft loaders must be able to position their platform horizontally even when the ground is inclined. They must also be able to position their platform parallel to the aircraft, in cases where the aircraft is resting on inclined ground and goods must be loaded into the cargo bay. The aircraft loaders should also preferably allow lateral movement of the platform, so that once the loader has approached as close as possible to the aircraft access ramp, the platform can be adjusted laterally so as to fit properly with respect to the cargo opening and then facilitate loading of the goods into the aircraft. Finally, transverse and longitudinal tilting of the platform is also sought-after, for two reasons. Firstly, it allows the platform to be positioned to the cargo bay entrance opening. Secondly, it increases the manoeuvrability of the loader, which is important since the cargo bay entrance opening is often just a few inches larger than the overall dimension of the loader in its lowered position.

Already known in the art, such as in U.S. Pat. No. 4,662,809 (Sturtz et al., 1987), aircraft loaders are provided with a platform, a base frame or chassis and a scissor lift assembly therebetween for raising and lowering the platform. The base frame acts as a guiding rail for the scissor mechanism so that the lower end of the scissor legs slides within the base frame when moving from open to closed position and vice versa. The base frame also provides rigidity to the loader, and ensures that the movement of the scissor legs never deviates from the set straight lines. One drawback with such loaders is that the control over the platform's position is limited and they are thus not suited for military applications.

Other versions of aircraft loaders are provided with a pair of foldable leg assemblies supporting the loading platform, different compared to scissors assembly in that each leg assembly is used to control respectively the front and the rear of the platform. These loaders do allow for longitudinal tilting of the platform, but since they have two foldable leg assemblies, they are generally bulky, heavy, and more complex to operate. U.S. Pat. No. 4,408,739 (Buschel, 1983) and U.S. Pat. No. 5,110,153 (Kallansrude et al., 1992) give examples of such loaders.

Although several types of aircraft loaders have been developed in the past, it is believed that there is still a need for an aircraft loader better adapted to irregular or uneven ground surfaces such as the ones frequently encountered in military applications.

SUMMARY OF THE INVENTION

An object of the present invention is to provide an aircraft cargo loader that satisfies the above-mentioned need.

In accordance with the present invention, that object is achieved with an aircraft cargo loader comprising:
 a longitudinal deck platform;
 a front and a rear wheel assembly units; and
 an articulate scissor assembly extending longitudinally under the platform for supporting the platform.

The articulate scissor assembly comprises a first and a second elongated arm pivotally connected by a swivel joint, allowing the scissor assembly to move between an open position where the deck platform is in a raised position and a closed position where the deck platform is in a lowered position.

Each of the first and second elongated members have also an upper end pivotally attached to the deck platform and a lower end pivotally connected to the rear and front wheel assembly unit respectively. In the scissor assembly, one of the first and second elongated members is articulated and comprises an upper segment pivotally connected to a lower segment.

A first and second controllable actuators are also provided. The first controllable actuator moves the scissor assembly between the open and close positions and the second controllable actuator actuates an articulation of the upper segment relative to the lower segment so as to tilt the deck platform longitudinally.

Thanks to the articulate scissor assembly described above, the slant of the deck platform can be longitudinally controlled independently of the position of the front and rear wheels assembly. Then, the deck platform can be longitudinally tilted in order to elevate one of them relatively to the other. The slant of the deck platform can be also finely tilted in order, for instance, to compensate for the incline of the ground or aircraft floor. The use of a scissor assembly combined with wheels provides flexibility and stability of the loader, even on irregular or uneven ground surface.

According to a preferred embodiment of the invention, the upper segment of the one elongated member is pivotally connected to the lower segment by the swivel joint.

Also preferably, the first elongated member and the second elongated member are each pivotally attached respectively to a front and a rear transverse shaft extending underneath the platform.

According to another preferred embodiment of the invention, the first and second elongated members each comprises a pair of parallel arms.

More preferably, each pair of parallel arms of the first and second elongated members are secured to one another by an upper transverse rod and a lower transverse rod. The rods respectively connect an upper portion and a lower portion of the pair of arms. The swivel joint then preferably delimitates the upper from the lower portion.

Still preferably, the swivel joint consists of a pair of pins, each pin pivotally connecting one of the parallel arms of the first member with a corresponding one of the parallel arms of the second elongated member.

Also preferably, the first actuator is a cylinder having a first and second end. The first end is connected to the upper transverse rod of one of the elongated members and the second end is connected to the lower transverse rod of the other elongated member.

Preferably, in the aircraft cargo loader according to the invention the articulated member is the second elongated member. The second actuator is also preferably a cylinder having a first end connected to the upper transverse rod of second elongated member and a second end connected to the lower transverse rod of the first elongated member.

According to a further preferred embodiment of the invention, one of the front and rear wheel assembly units is motorized, thereby allowing self propulsion of the loader.

According to a yet further preferred embodiment of the invention, the aircraft cargo loader further comprises an adjusting mechanism for transversally tilting the deck platform. Particularly, the adjusting mechanism comprises the front transverse shaft having a first end and a second end, each end is provided with a cam extension pointing in opposite longitudinal directions. Each of the cam extensions is then connected to the platform in a pivotal and a longitudinal slidable relationship. The front transverse shaft is movable in rotation between:

a. a first tilt angular position where the cam extension of the first end points upwards whereas the cam extension of the second end points downwards and where one of said longitudinal side of the platform is tilted with respect to the other longitudinal side;

b. a neutral angular position where the cam extensions are at the same level and so are the two longitudinal sides of the platform; and c. a second tilt position where the cam extension of the first end points downwards whereas the cam extension of the second end points upwards and where said other longitudinal side of the platform is tilted with respect to said one longitudinal side.

An actuator is also provided to actuate the rotational movement of the front transverse shaft.

According to another preferred embodiment of the invention, the aircraft cargo loader further comprises a shifting means for moving at least the front transverse shafts transversally, thereby allowing the platform to be shifted laterally relative to the scissor assembly.

The present invention and its advantages will be better understood and apparent upon reading the following detailed description of a preferred embodiment thereof, made with reference to the accompanying drawings.

DESCRIPTION OF A PREFERRED EMBODIMENT OF THE INVENTION

In the following description, similar features in the drawings have been given similar reference numerals. To preserve the clarity of the drawings, some references numerals have been omitted, if they were already identified in a preceding Figure.

As it will be appreciated from reading the following description, the aircraft loader shown in the Figures is advantageously suitable for military purposes. Indeed this loader can easily be used on uneven or inclined surfaces for loading cargo onto an aircraft whose cargo bay may not be level with the ground surface. The loader platform can advantageously be raised and longitudinally tilted in order to compensate, for instance, for the incline of the ground or aircraft floor. The deck platform's movement may also be finely controlled with a mechanism that can tilt one end of the platform transversally (i.e: elevate one side of the platform relative to the other). or displaced laterally.

Figure 1:
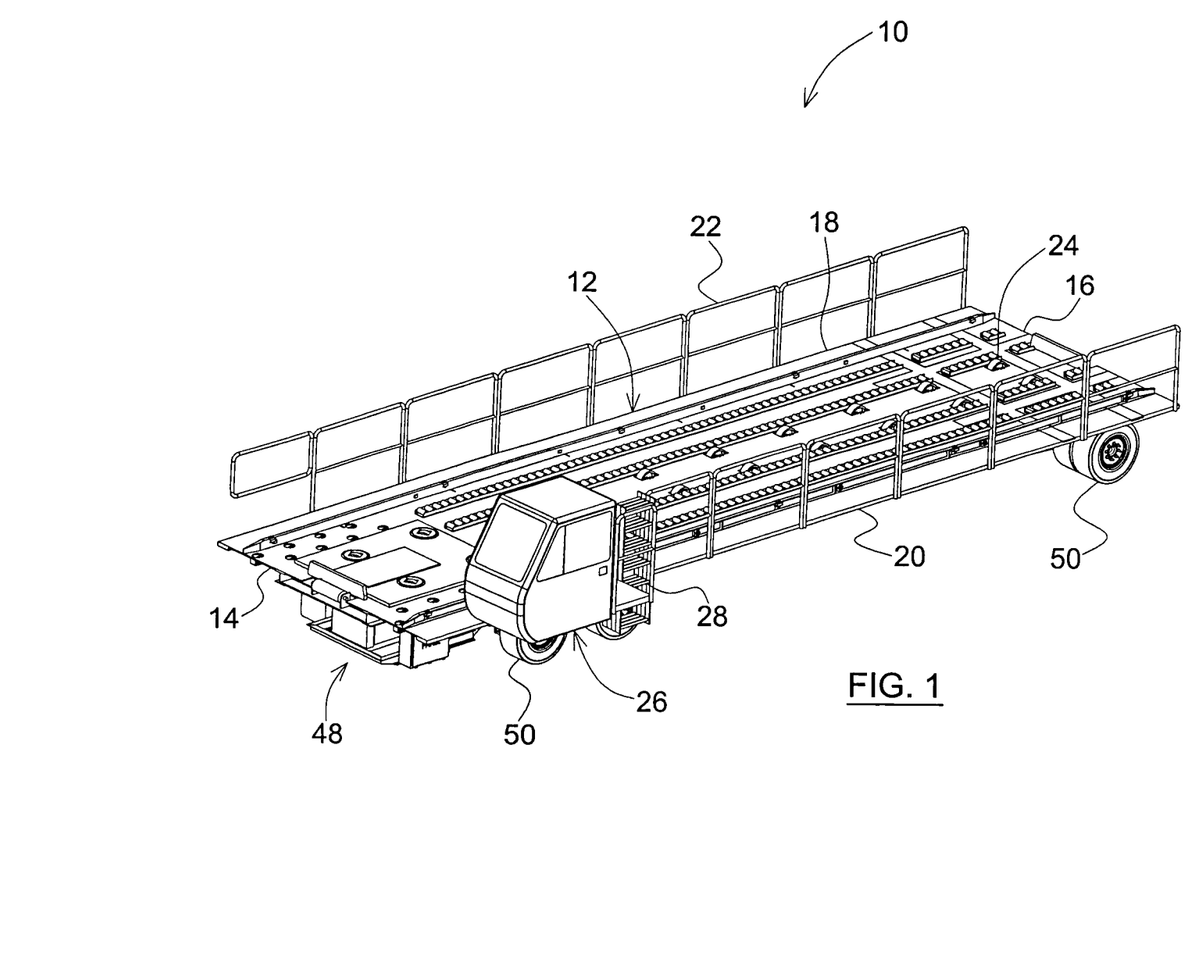
FIG. 1 is a perspective view of an aircraft loader, according to a preferred embodiment of the present invention, with its platform in a lowered position.
Figure 2:
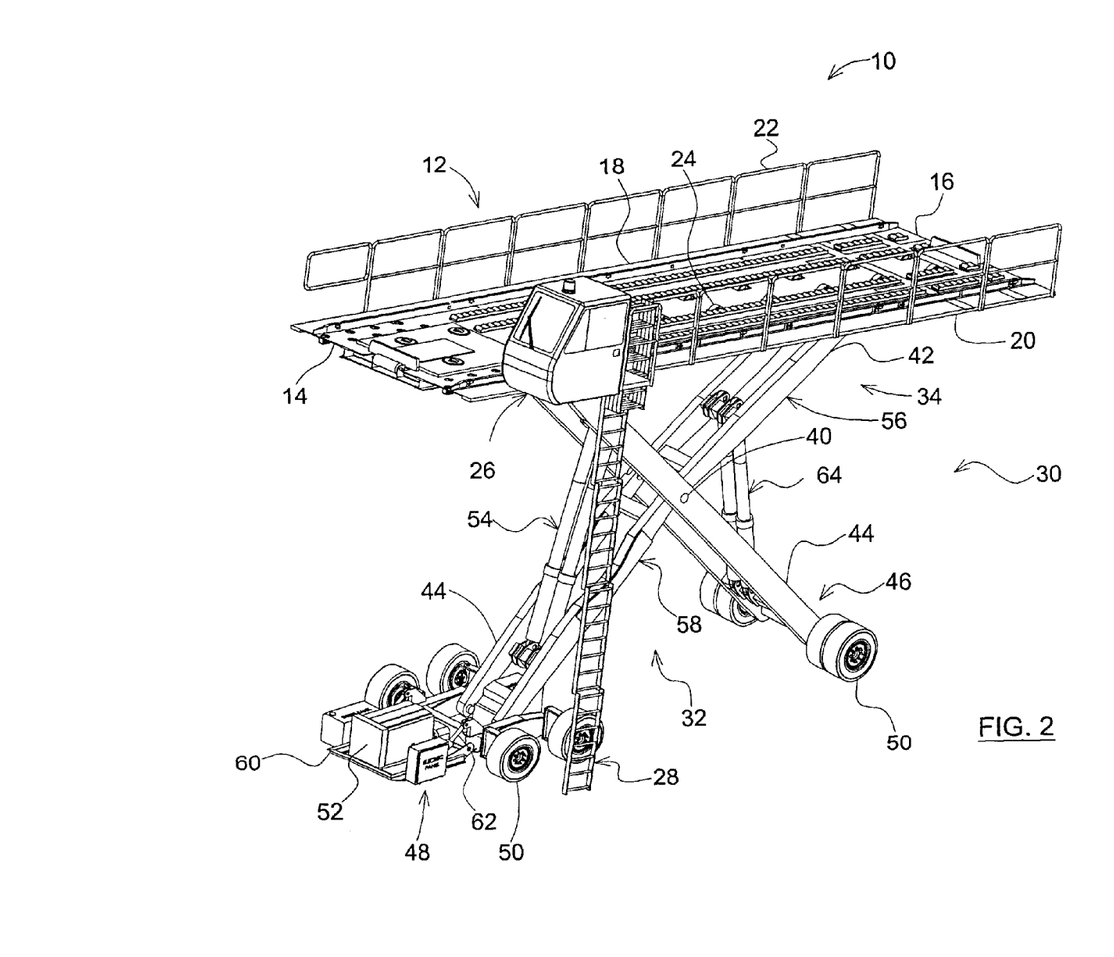
FIG. 2 is another perspective view of the aircraft loader of FIG. 1, with its platform in a raised position.

Referring to FIGS. 1 and 2, the aircraft cargo loader 10 first comprises a longitudinal deck platform 12 having front 14 and rear 16 ends, and two opposite longitudinal sides 18, 20.

The deck platform 12 is preferably provided with handrails 22 for preventing loads and operators from falling from the platform 12. The upper surface of the platform is preferably made of metal, and may be provided with dancer rolls 24, mobile rails and motorized platform wheels for facilitating the convoying of loads over the surface of the platform 12 and from the platform 12 to an aircraft cargo bay.

Adjacent to the deck platform 12 is a cabin 26 from where an operator can control the platform's movement. The cabin 26 can slide transversally over the platform 12 so as to minimize the width of the platform 12, such as is required when loading the entire aircraft loader 10 onto a plane. A retractable ladder 28 is preferably attached to the cabin for allowing operators to climb up or down from the cabin 26 when the loader is in a raised position (FIG. 2).

Figure 3:
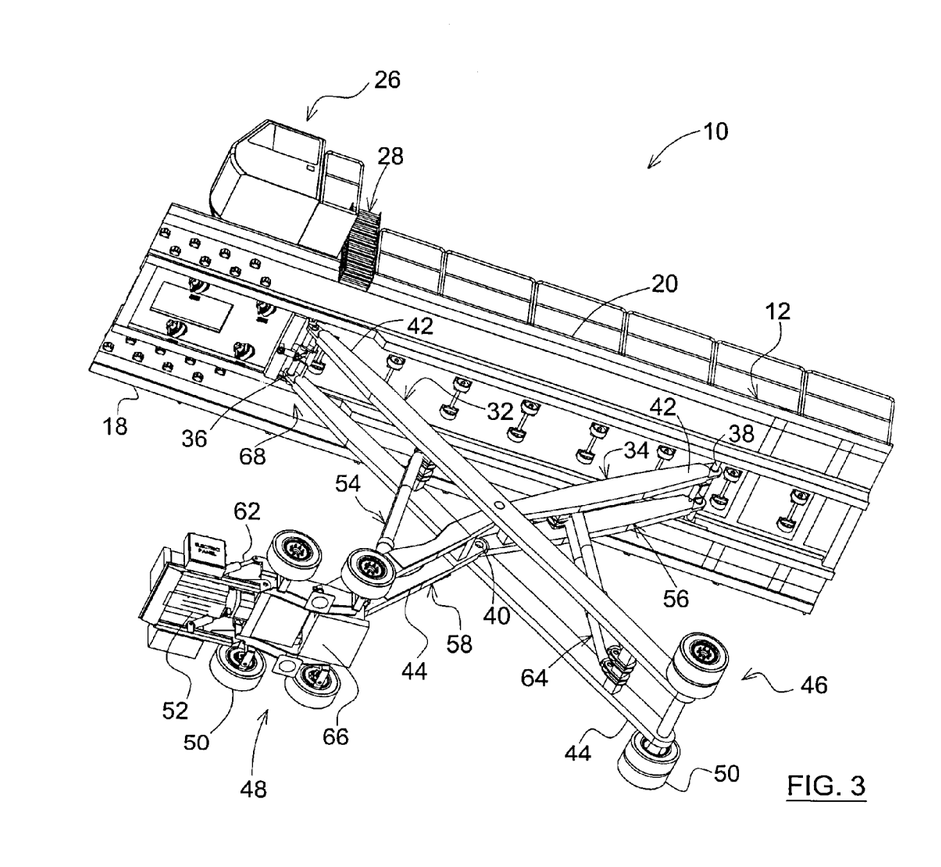
FIG. 3 is another perspective view of the aircraft loader of FIG. 2 viewed from underneath.

Detailed Description of the Articulate Scissor Assembly According to a Preferred Mode of Realization As best shown on FIGS. 2 and 3, a supporting assembly 30 extends under the deck platform 12 for supporting and moving the platform between a raised position (FIG. 2) and a lowered position (FIG. 1). The supporting assembly 30 comprises a first 32 and a second 34 elongated member each pivotally attached respectively to a front 36 and a rear 38 transverse shaft extending underneath the platform 12.

As illustrated on FIGS. 2 and 3, the supporting assembly is a scissor assembly 30 extending longitudinally under the deck platform 12 and supporting it. In that particular case, the first elongated member 32 and the second elongated member 34 are joined by a swivel joint 40 such as a pin or a shaft, allowing the scissor assembly 30 to move between an open position, where the deck platform 12 is in the raised position (FIG. 2) and a closed position, where the deck platform 12 is in the lowered position (FIG. 1).

In operation, the scissor assembly 30 is closed by pulling the first and the second elongated members 32 and 34 towards each other, thereby lowering the platform 12 and allowing cargo to be loaded on the platform. To unload the cargo into an aircraft, the scissor assembly 30 is opened, thereby raising the platform 12 to the level of an aircraft cargo bay.

In this preferred embodiment, best shown in FIGS. 2 and 3, the elongated members 32 and 34 are formed by a pair of spaced apart parallel legs. Other scissor assemblies involving a first 32 and a second 34 elongated members may also be considered. For example, the first member of the scissor assembly may be formed by a rectangular elongated frame and the second member formed by an elongated metal board pivotally inserted within such frame, both members being pivotable about a swivel shank or pin.

In the example illustrated, each of the first 32 and second 34 elongated members has an upper end 42 pivotally attached to the deck platform 12 and a lower end 44 pivotally connected to a first wheel assembly 46 and a second wheel assembly 48 respectively. At least one of the first 46 and second 48 wheel assemblies is motorized, thereby allowing self propulsion of the loader. In the illustrated embodiment, it is the second wheel assembly 48 located at the lower end 44 of the second elongated member 34, which is motorized.

Having the second wheel assembly 48 motorized at the ground level also provides rigidity and stability to the loader 10. The friction between the wheels 50 of the second wheel assembly 48 and the ground replaces the guiding element which was traditionally provided by a guiding rail frame or cross-members (see for example U.S. Pat. No. 4,662,809). In other words, having one set of motorized wheel assembly allows the loader to work without any frame, and without any cross-members.

A diesel motor 52 is preferably used to motorize the second wheel assembly 48, but an electric motor could be used as well. The diesel motor 52 may be mounted on a platform 60 connected to the wheel assembly 48.

The second wheel assembly 48 may be also provided with hydraulic brakes for braking or preventing the movement of the wheels. Of course, the first or rear wheel assembly 46 may be motorized instead of the second wheel assembly 48. In yet another configuration, both first and second wheel assemblies 46, 48 may be motorized.

As shown in FIGS. 2 and 3, a first actuator 54 may be used to actuate the movement of the scissor assembly 30 between the open and closed positions. The first actuator 54 is preferably a hydraulic cylinder attached to a shaft placed between the legs of the lower section of the second member 34 and extending to another shaft placed between the legs of the upper section of the first member 32.

Figure 9A:
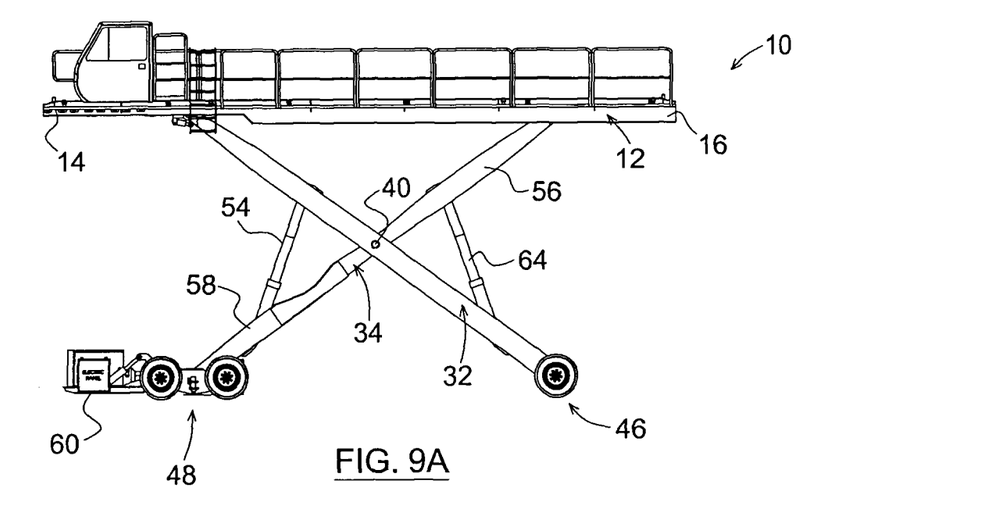
FIGS. 9A and 9B are side elevation views of the aircraft loader to FIG. 1 in a raised horizontally position (FIG. 9A) and in a raised longitudinally tilted position (FIG. 9B).
Figure 9B:
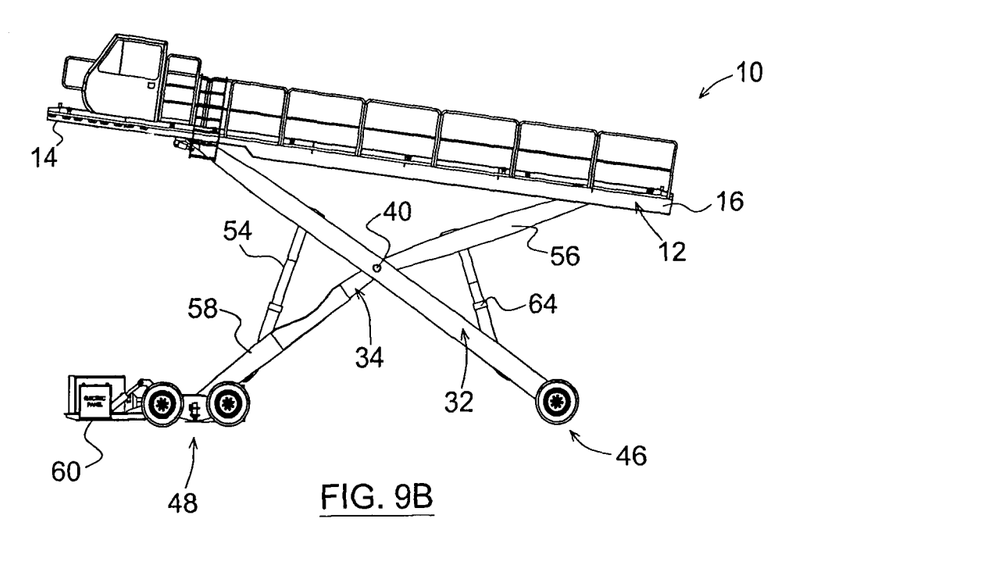

As shown in FIGS. 2, 3 and also 9, the second elongated member 34 is articulated and formed by an upper section 56 that is pivotally connected to a lower section 58 by means for example of the swivel shaft 40. As shown in FIG. 9B, this particular configuration allows longitudinal tilting of the deck platform 12 meaning that the rear end 16 of the platform 12 can be lowered relative to the front end 14 and vice versa. This articulation is particularly advantageous when, for example, the loader 10 must transport a load over a slope, since it keeps the deck platform 12 and its cargo horizontally level, even if the wheel assemblies 46, 48 are at different heights. In such situations, the motor platform 60 on which the motor 52 is placed can also tilt longitudinally to follow the ground incline. Two hydraulic jacks 62 allow for this tilting movement of the motor platform 60.

In another example, the articulation of the second elongated member 34 is also useful when the loader must be loaded into an aircraft, and when the aircraft stands on an inclined ground surface. An operator can adjust the level of the deck platform 12 to make it parallel to the aircraft cargo floor by manoeuvring the upper section 56 of the second elongated member 34 over the aircraft access ramp, and then into the plane. Of course, in other embodiments of the invention, the first elongated member 32 may be articulated, or both the first 32 and the second 34 members could be articulated.

As illustrated, a second actuator 64 is used for moving the upper section 56 of the second elongated member 34 relative to the lower section 58. The second actuator 64 is preferably a hydraulic cylinder attached to a shaft placed between the legs of the lower section 44 of the first member 32 and extending to another shaft placed between the legs of the upper section 42 of the second member 34. A hydraulic reservoir 66, which can be seen in FIG. 3, may be placed near the second wheel assembly 48 to provide fluids to the first actuator 54 and the second actuator 64 of the loader 10.

As mentioned above, the cargo loader may also be provided with an adjusting mechanism 68 to finely control the transversal tilt of the deck platform 12 and optionally its transversal displacement. A preferred mode of realization of this adjustment mechanism 68 will now be described in more details.

Figure 4A:
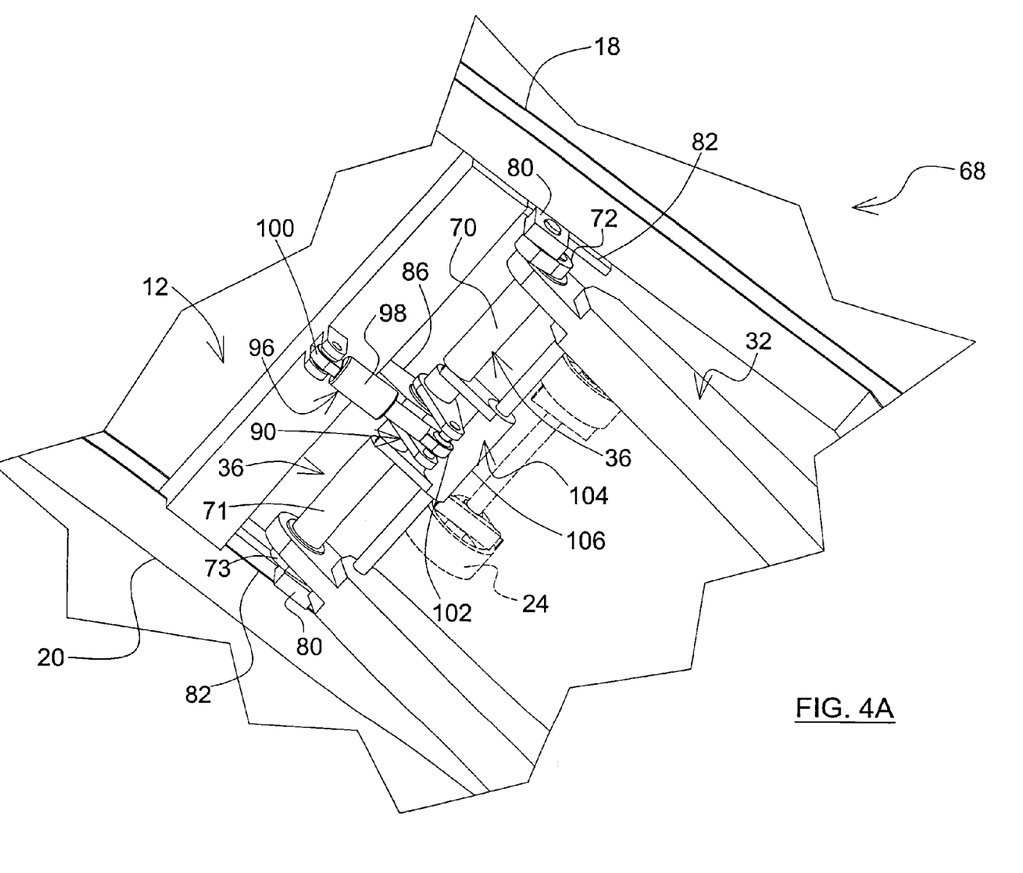
FIG. 4A is an enlarged perspective view of FIG. 3, showing the adjusting mechanism according to a preferred variant, wherein the cylinder used for rotating the transversal shaft is in a stretched position.
Figure 4B:
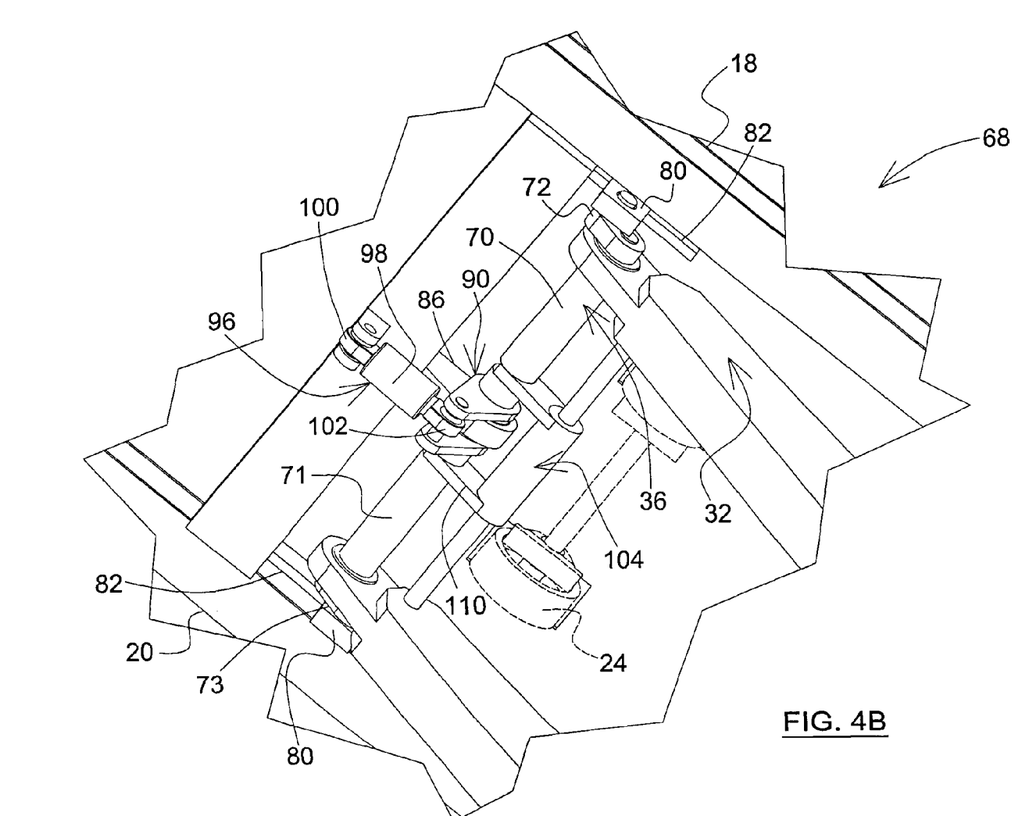
FIG. 4B is the same view as FIG. 4A, showing the cylinder in a retracted position.
Figure 5:
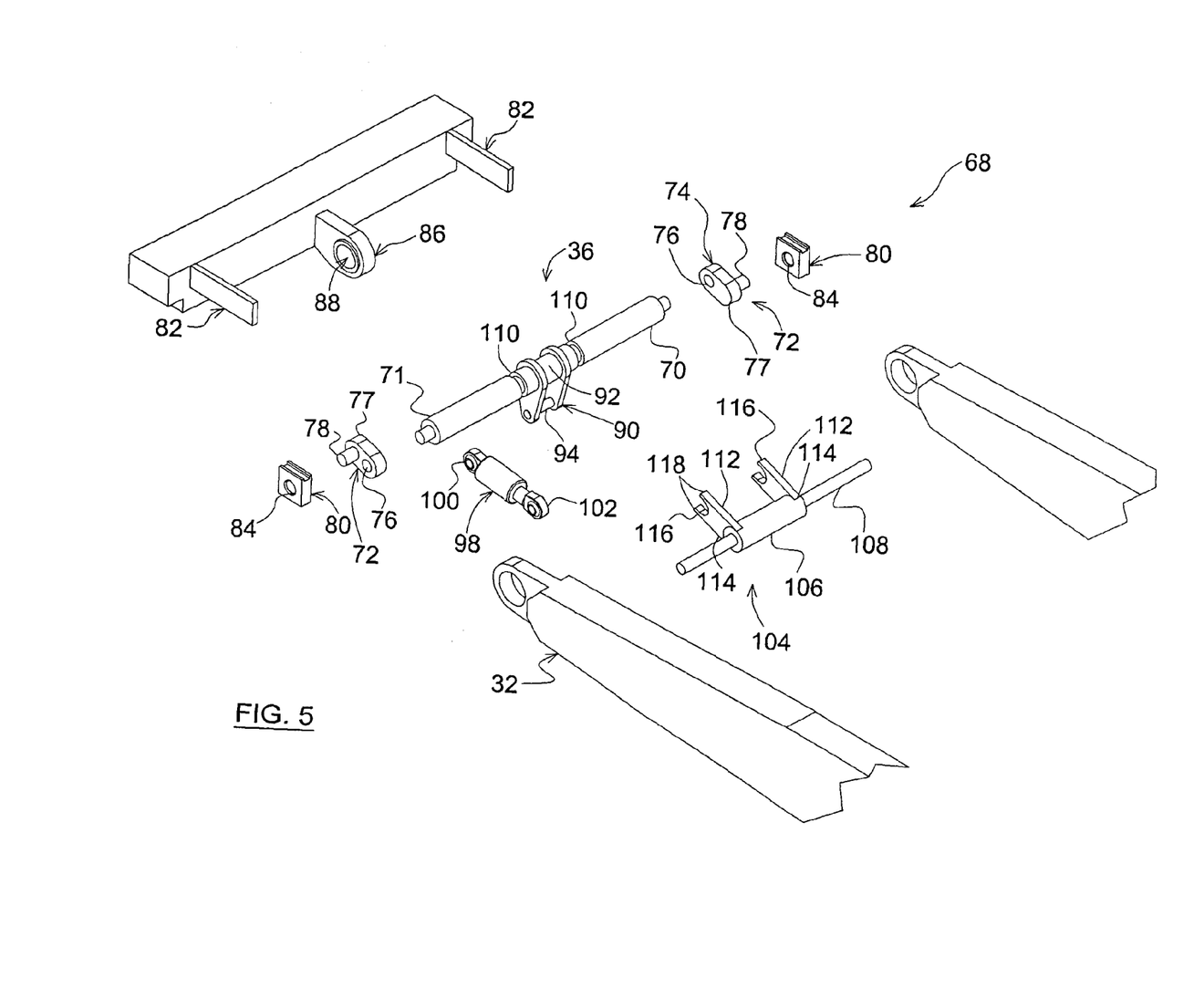
FIG. 5 is an exploded view of the adjusting mechanism of FIG. 4.
Figure 6A:
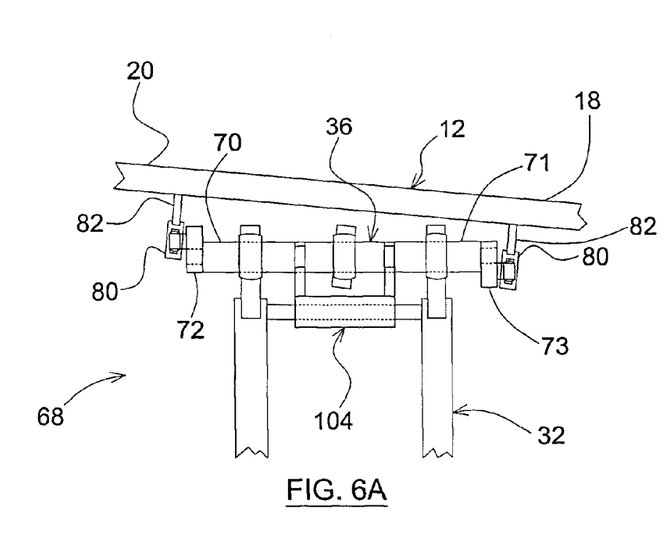
FIGS. 6A, 6B and 6C are various frontal views of the adjusting mechanism of FIG. 4 showing the front transverse shaft in three different angular positions which respectively causes the platform to tilt to the right (FIG. 6A), to remain horizontal (FIG. 6B) and to tilt to the left (FIG. 6C).
Figure 6B:
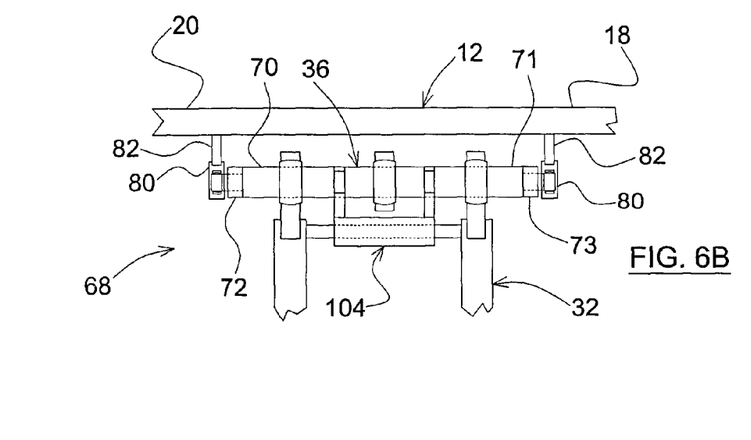
Figure 6C:
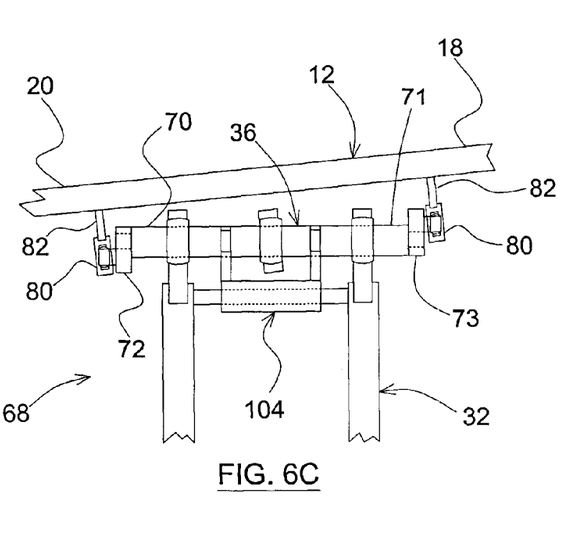

Turning to FIGS. 4 to 6, the adjustment mechanism 68 first comprises the front transverse shaft 36 of the first elongated member 32 having a first end 70 and a second end 71, each end provided with a cam extension 72, 73 pointing in opposite longitudinal directions. Each of the cam extensions 72, 73 are connected to the deck platform 12 in a pivotal and a longitudinal slidable relationship.

Referring to FIGS. 6A, 6B and 6C, the front transverse shaft 36 is movable in rotation between a first or right tilt angular position (FIG. 6A); a neutral angular position (FIG. 6B) and a second or left tilt position (FIG. 6C).

In the first tilt angular position, as in FIG. 6A, the cam extension 72 of the first end 70 points upwards whereas the cam extension 73 of the second end 71 points downwards, thereby causing one of the longitudinal side 20 of the platform 12 to be tilted with respect to the other longitudinal side 18.

In the neutral angular position, as in FIG. 6B, the cam extensions 72, 73 are at the same level and so are the two longitudinal sides 18, 20 of the platform. In the second tilt position, as in FIG. 6C, the cam extension 72 of the first end 70 points downwards whereas the cam extension 73 of the second end 71 points upwards, thereby causing the other longitudinal side 18 of the platform 12 to be tilted with respect to said one longitudinal side 20.

As shown in FIGS. 4 and 5, each one of the cam extensions 72, 73 may be an oblong plate 74 having a first end 76 secured to the front transverse shaft 36, and a second end 77 provided with a transverse rod 78 protruding outwardly, opposite the front transverse shaft 36. More preferably, the adjusting mechanism comprises a pair of sliding pads 80. Each sliding pad 80 is associated and slidably connected to a respective longitudinal rail 82 affixed underneath the platform 12. Each of the sliding pads 80 is also provided with a hole 84 for receiving a corresponding one of the transverse rods 78 in rotation.

As best viewed in FIG. 5, the front transverse shaft 36 is mounted in rotation within a through hole 88 provided in a connecting member 86 secured to the underside of the platform; and the actuation of the rotational movement of the shaft 36 is preferably provided thanks to the combined action of a lever 90 connected to the front transverse shaft 36 and an actuator operatively connected to the lever 90. More specifically, the lever 90 has a fulcrum end 92 secured to the front transverse shaft 36 and an effort end 94 opposite the fulcrum end 92; and the actuator is preferably a cylinder 98, such as an hydraulic cylinder, having a first end 100 pivotally mounted to the platform 12, as shown in FIGS. 4A and 4B, and a second end 102 pivotally connected to the effort end 94 of the lever 90. The controlled movement of the cylinder 98 causes the lever 90 to pivot about the fulcrum end 92, thereby causing the front transverse shaft 36 to rotate between the above mentioned first tilt angular position, neutral angular position and second tilt position, and thus to tilt one longitudinal side of the platform 12 relative to the other 18, 20. This movement is transferred to the cam extension 72, that can slide on the longitudinal rails 82 of the platform 12 thanks to the sliding pads 80.

Figure 7A:
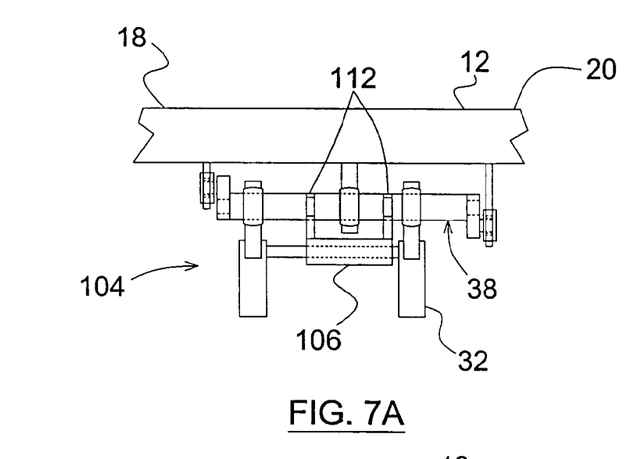
FIGS. 7A, 7B and 7C are various frontal views of the adjusting mechanism showing the front transverse shaft, in a right translated position (FIG. 7A); a neutral centered position (FIG. 7B) and in a left translated position (FIG. 7C).
Figure 7B:
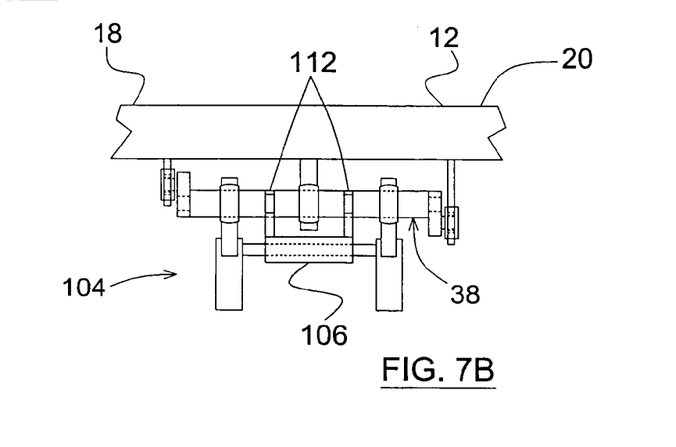
Figure 7C:
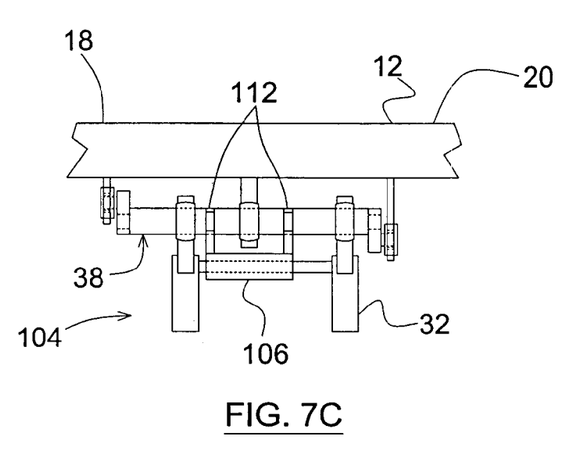

As also illustrated on FIGS. 4, 5 and 7, the aircraft cargo may further comprise a shifting means 104 for moving at least the front transverse shaft 36 transversally, thereby allowing the platform 12 to be shifted laterally relative to the supporting assembly 30.

As illustrated, the shifting means 104 preferably comprises a controllable cylinder 106 slidable over a cylinder shaft 108 mounted transversally between the arms of the first elongated member 32 close to the front transverse shaft 36 and an extension extending from the cylinder 106 and engaging the front transverse shaft 36. Referring to FIGS. 7A, 7B and 7C, the front transverse shaft 36 may be shifted between a first transversal position (FIG. 7A); a neutral transversal position (FIG. 7B) and a second transversal position (FIG. 7C).

As best viewed from FIG. 5, the front transverse shaft 36 is provided with two annular grooves 110 and the extension is preferably a pair of arms 112 each being associated with one of the grooves 110 respectively. Each arm has one end 114 secured to the controllable cylinder 106 and the other end 116 engaging the transverse shaft 36. In order to engage the shaft 36, that other end 116 of each arm 112 may have the shape of a fork with two prongs 118 sized to fit within a respective groove 110. As can be appreciated by referring to FIG. 7, when the controllable cylinder 106 slides on the cylinder shaft 108, the arms 112 which engages the front transverse shaft 36 causes the same to be shifted transversally with respect the elongated member 32.

Figure 8:
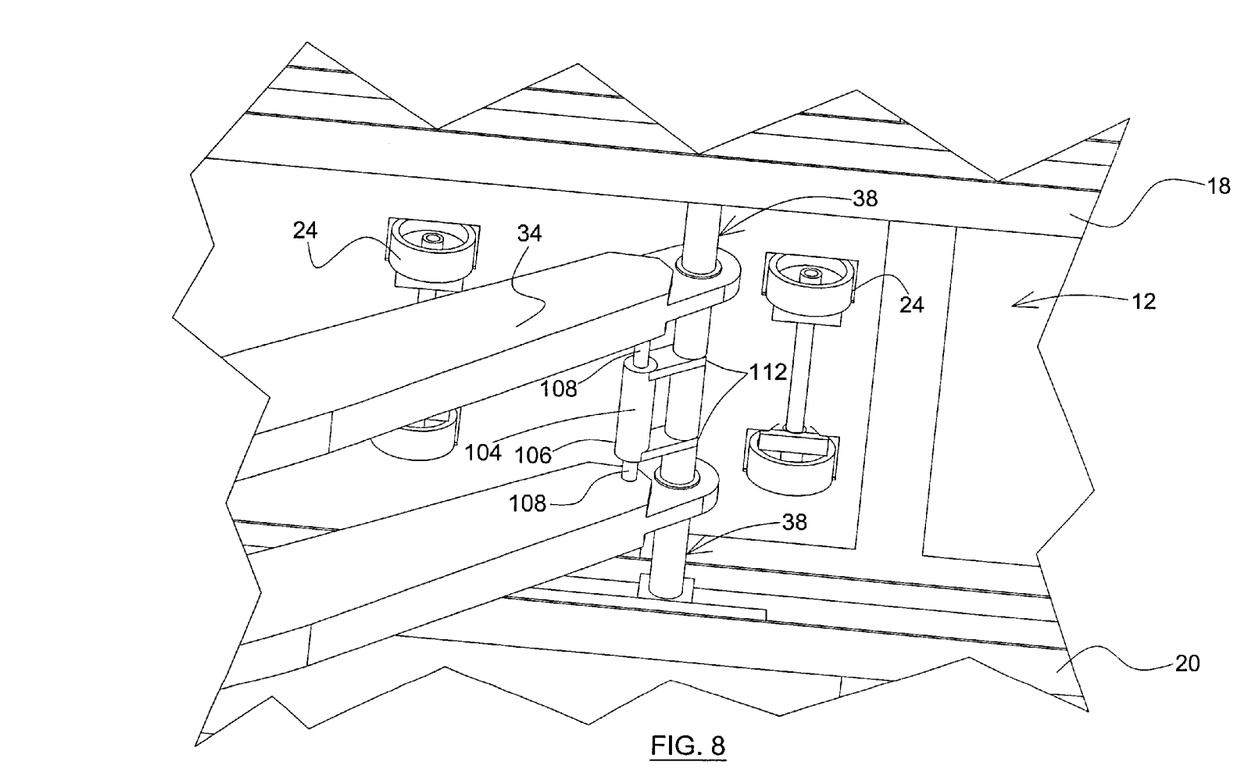
FIG. 8 is still an enlarged perspective view of FIG. 3, showing the rear transverse shaft.

As illustrated in FIG. 8, the cargo loader 10 may also comprise another shifting means 104 identical to the shifting means used at the front transverse shaft 36, in order to move also the rear transverse shaft 38 transversally with respect to the second elongated member 34.

As can be appreciated from the above description, the cargo loader may comprises from one to three adjusting mechanisms allowing the platform to be adjusted longitudinally, laterally and/or transversally allowing a combined tilting, lifting and sliding movement of at least one end of the platform. The advantage of this combination of elements is that when cargo is loaded into the aircraft, the cargo loader can easily follow the movement of the floor of the aircraft, commonly known in the art as the aircraft attitude.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. An aircraft cargo loader comprising:
a longitudinal deck platform;
a front and a rear wheel assembly units; and
an articulate scissor assembly extending longitudinally under the platform for supporting the platform, the articulate scissor assembly comprising:
a first and a second elongated arm pivotally connected by a swivel joint, allowing the scissor assembly to move between an open position where the deck platform is in a raised position and a closed position where the deck platform is in a lowered position;
each of the first and second elongated members having an upper end pivotally attached to the deck platform and a lower end pivotally connected to the rear and front wheel assembly unit respectively;
one of the first and second elongated members being articulated and comprising an upper segment pivotally connected to a lower segment, the upper segment being able to pivot relative to the lower segment;
a first controllable actuator to move the scissor assembly between the open and closed positions and a second controllable actuator to actuate an articulation of the upper segment relative to the lower segment so as to tilt the deck platform longitudinally;
wherein the first and second elongated members each comprises a pair of parallel arms, each pair of parallel arms of the first and second elongated members are secured to one another by an upper transverse rod and a lower transverse rod, respectively connecting an upper portion and a lower portion of said pair of arms, the swivel joint delimitating the upper from the lower portion; and
wherein the articulated member is the second elongated member; and the second actuator is a cylinder having a first end connected to the upper transverse rod of second elongated member and a second end connected to the lower transverse rod of the first elongated member.

2. An aircraft cargo loader according to claim 1, wherein the upper segment of said one elongated member is pivotally connected to the lower segment by the swivel joint.

3. An aircraft cargo loader according to claim 1 or 2, wherein the first elongated member and the second elongated member are each pivotally attached respectively to a front and a rear transverse shaft extending underneath the platform.

4. An aircraft cargo loader according to claim 3, further comprising an adjusting mechanism for transversally tilting the platform, comprising:
the front transverse shaft having a first end and a second end, each end provided with a cam extension pointing in opposite longitudinal directions;
each of said cam extensions being connected to the platform in a pivotal and a longitudinal slidable relationship;

said front transverse shaft being movable in rotation between:
a. a first tilt angular position where the cam extension of the first end points upwards whereas the cam extension of the second end points downwards and where one of said longitudinal side of the platform is tilted with respect to the other longitudinal side;
b. a neutral angular position where the cam extensions are at the same level and so are the two longitudinal sides of the platform; and
c. a second tilt position where the cam extension of the first end points downwards whereas the cam extension of the second end points upwards and where said other longitudinal side of the platform is tilted with respect to said one longitudinal side; and an actuator to actuate the rotational movement of the front transverse shaft.

5. An aircraft cargo loader according to claim 3, further comprising a shifting means for moving at least the front transverse shafts transversally, thereby allowing the platform to be shifted laterally relative to the scissor assembly.

6. An aircraft cargo loader according to claim 1, wherein the swivel joint consists of a pair of pins, each pin pivotally connecting one of the parallel arms of the first member with a corresponding one of the parallel arms of the second elongated member.

7. An aircraft cargo loader according to claim 1, wherein the first actuator is a cylinder having a first end connected to the upper transverse rod of one of the elongated members and a second end connected to the lower transverse rod of the other elongated member.

8. An aircraft cargo loader according to claim 1, wherein one of the front and rear wheel assembly units is motorized, thereby allowing self propulsion of the loader.

\* \* \* \* \*